Oct. 2, 1956 C. WHITE 2,765,139
BEAM CLAMP
Filed Dec. 29, 1953
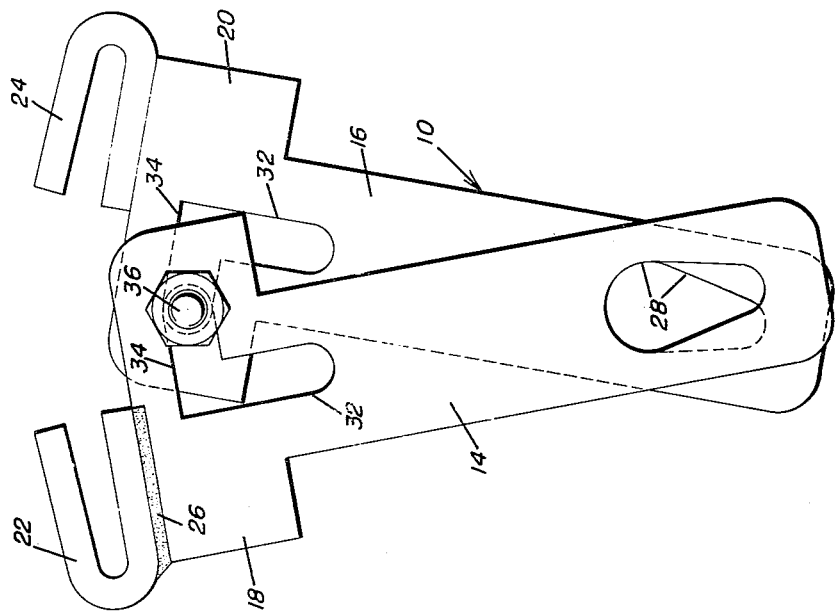
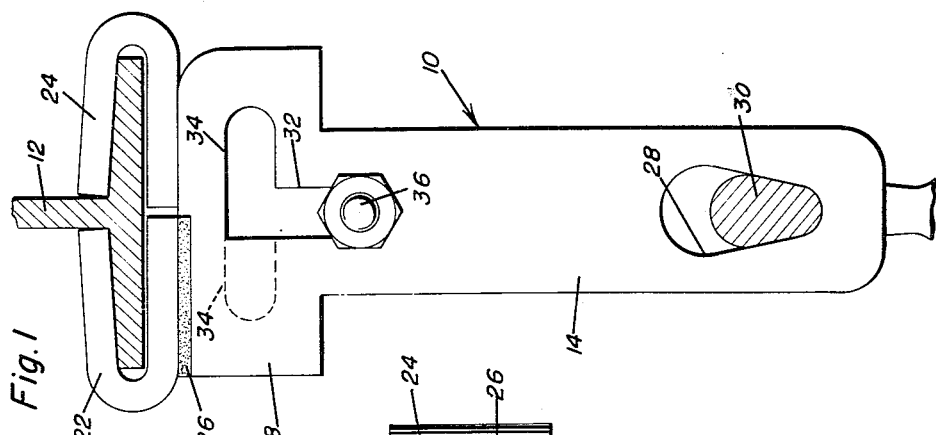
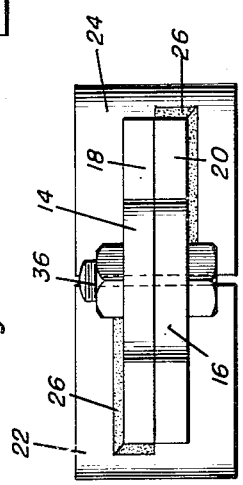
Claude White
INVENTOR.
BY

United States Patent Office 2,765,139
Patented Oct. 2, 1956

2,765,139

BEAM CLAMP

Claude White, Baton Rouge, La.

Application December 29, 1953, Serial No. 400,840

2 Claims. (Cl. 248—228)

This invention relates to a beam clamp, and more specifically provides a device for selective attachment to a beam flange for supporting a load therefrom.

An object of this invention is to provide a beam clamp for attachment to a beam flange which is versatile in utility, simple in construction, easy to assemble and disassemble, well adapted for its purposes and inexpensive to manufacture.

Another object of this invention is to provide a beam clamp having a pair of members interconnected by a fastening bolt or pin wherein no strain is placed upon the bolt or pin.

A further object of this invention is to provide a beam clamp including a pair of members normally overlapped with each of the members having a right angular slot therein and a fastening bolt or pin slidable in the slots. When the vertical portions of the slots are overlapped, the beam clamp is engaging the beam flange and secured thereto and when the bolt is moved vertically into the horizontal slots, the overlapping members may be moved relative to each other, thereby disengaging the beam clamp from the beam flange.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing the beam clamp of the present invention secured to a beam flange;

Figure 2 is a side elevational view similar to Figure 1 showing the beam clamp in extending or unclamped position; and Figure 3 is a bottom plan view of the beam clamp in clamped relation.

Referring now specifically to the drawings, it will be seen that the numeral 10 generally designates the beam clamp of the present invention for attachment to the flange 12 of an I-beam. The beam clamp 10 includes two T-shaped members 14 and 16 having an elongated shank portion and a cross-piece indicated by the numerals 18 and 20. A U-shaped member 22 is secured to the upper end of the cross-piece 18 and a U-shaped member 24 is secured to the upper edge of the cross-piece 20. The U-shaped members 22 and 24 are secured to their respective cross-pieces 18 and 20 by suitable welding, as indicated by the numeral 26. The lower end of the shanks 14 and 16 are provided with pear-shaped openings 28 for receiving a hook bill 30 or other suitable load supporting means.

Adjacent the juncture between the cross-pieces 18 and 20 and the shanks 14 and 16 is a right angular slot having a vertical portion 32 and a horizontal portion 34. The vertical portion 32 of each slot is disposed partially in the shanks 14 and 16 and partially in the cross-pieces 18 and 20. The horizontal portions 34 of the slots are disposed in the cross-pieces and extend in opposite directions in relation to each other. A fastening bolt or pin 36 is slidably positioned in the slots. The bolt 36 is not tightened completely, thereby permitting sliding movement of the bolt in the vertical portion 32 and the horizontal portions 34 of the slots and also permitting relative sliding movement of the T-shaped members 14 and 16.

The operation of the device will be readily understood. With the members in the relation as shown in Figure 1, the bolt or pin 36 is raised upwardly until the bolt 36 may pass into the horizontal portions 34 of the slots, thereby permitting the horizontal portions 34 to come into registry or overlapping relation and permitting the cross-pieces 18 and 20 to move outwardly in relation to each other, thereby permitting the U-shaped members 22 and 24 to become disengaged from the beam flange 12. In order to assemble the beam clamp 10 to the beam flange 12, the T-shaped members 14 and 16 are moved in relation to each other, thereby bringing the vertical portions 32 in overlapping relation and permitting the bolt 36 to drop vertically into the vertical portions 32. It will be understood that there is no strain on the bolt 36 and all of the load supported on the member 30 is taken up by the members 14 and 16. It will be understood that this particular arrangement provides a novel and efficient beam clamp for rapid assembling onto a beam flange 12, and may be utilized for suspending or picking up a load. It is especially useful in scaffolding such as used by painters or other mechanics. The device may be constructed of easily obtainable and readily available stock material, thereby enhancing the economic feasibility of the device. It will be seen that the cross-pieces 18 and 20 are secured in an offset manner on the U-shaped members 22 and 24, thereby making the U-shaped members aligned when in assembled relation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A beam clamp for attachment to a beam flange comprising a pair of normally overlapping vertically elongated members, means on one end of said members for engaging a beam flange, means at the other end of said members for supporting a load, and means interconnecting said members for permitting selective engagement and disengagement with the beam flange, said interconnecting means including a right angle slot in each member, and a fastening bolt slidably positioned in said slots, said right angle slots having vertical portions normally overlying each other and horizontal portions extending outwardly in opposite directions from each other, said fastening bolt being disposed in said vertical portions when said clamp is attached to a beam flange and movable to the horizontal portions to permit the overlapping members to be moved away from each other.

2. A beam clamp for attachment to a beam flange comprising a pair of normally overlapping vertically elongated members, means on one end of said members for engaging a beam flange, means at the other end of said members for supporting a load, and means interconnecting said members for permitting selective engagement and disengagement with the beam flange, said interconnecting means including a right angle slot in each member, and a fastening bolt slidably positioned in said slots, said right angle slots having vertical portions normally overlying each other and horizontal portions extending outwardly in opposite directions from each other, said fastening bolt being disposed in said vertical portions when said clamp is attached to a beam flange and movable to the horizontal portions to permit the overlapping members to be moved away from each other, said load supporting means including a closed slot in the lower end of each member, said closed slots partially overlying when the clamp is disengaged, said closed slots having downwardly and inwardly inclined side walls for receiving a hook bill wherein the load urges the slots toward final alignment.

References Cited in the file of this patent

UNITED STATES PATENTS

| | | |
|---|---|---|
| 307,028 | Durand | Oct. 21, 1884 |
| 415,689 | Williams | Nov. 19, 1889 |
| 669,699 | Jackson | Mar. 12, 1901 |
| 1,046,698 | Whichello | Dec. 10, 1912 |
| 1,160,194 | Painter | Nov. 16, 1915 |
| 2,524,537 | Osmonson | Oct. 3, 1950 |